US008504257B2

(12) United States Patent
Yamaguchi et al.

(10) Patent No.: US 8,504,257 B2
(45) Date of Patent: Aug. 6, 2013

(54) WORK VEHICLE AND METHOD OF CONTROLLING THE SAME

(75) Inventors: Eiji Yamaguchi, Komatsu (JP); Takashi Kuse, Komatsu (JP); Yasutaka Kuse, legal representative, Hirakata (JP); Miki Kuse, legal representative, Komatsu (JP); Reiko Kuse, legal representative, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/508,501

(22) PCT Filed: Feb. 10, 2011

(86) PCT No.: PCT/JP2011/052898
§ 371 (c)(1),
(2), (4) Date: May 7, 2012

(87) PCT Pub. No.: WO2011/099568
PCT Pub. Date: Aug. 18, 2011

(65) Prior Publication Data
US 2012/0245805 A1 Sep. 27, 2012

(30) Foreign Application Priority Data
Feb. 10, 2010 (JP) ................................. 2010-027272

(51) Int. Cl.
*G06F 17/00* (2006.01)
(52) U.S. Cl.
USPC .................................. 701/50; 701/54; 701/67

(58) Field of Classification Search
USPC .......................................... 701/50, 54, 67, 84
See application file for complete search history.

(56) References Cited

U.S. PATENT DOCUMENTS

| 5,160,003 A | 11/1992 | Suzuki |
| 6,615,963 B2 * | 9/2003 | Ono et al. .................. 192/3.63 |
| 7,771,314 B2 * | 8/2010 | Eguchi et al. ................ 477/110 |
| 8,182,394 B2 * | 5/2012 | Yamaguchi et al. ........... 477/65 |

FOREIGN PATENT DOCUMENTS

| JP | 2-195027 A | 8/1990 |
| JP | 3-292462 A | 12/1991 |
| JP | 2006-226333 A | 8/2006 |
| JP | 2009-103258 A | 5/2009 |
| JP | 2009-275858 A | 11/2009 |
| WO | WO 2009/041205 A1 | 4/2009 |

OTHER PUBLICATIONS

International Search Report of corresponding PCT Application No. PCT/JP2011/052898.

* cited by examiner

Primary Examiner — James Trammell
Assistant Examiner — Jerrah Edwards
(74) *Attorney, Agent, or Firm* — Global IP Counselors, LLP (57) ABSTRACT

In a work vehicle, a control unit is configured to control a lock-up hydraulic pressure for controlling switching of a lock-up clutch. The control unit is configured to execute a lock-up slippage control for switching the lock-up clutch into a slippage state when the work vehicle starts moving. The control unit is configured to control the lock-up hydraulic pressure based on work instrument load information, pertaining to a load of a work instrument during execution of the lock-up slippage control.

5 Claims, 6 Drawing Sheets

WORK VEHICLE AND METHOD OF CONTROLLING THE SAME

CROSS-REFERENCE TO RELATED APPLICATIONS

This application claims priority to Japanese Patent Application No. 2010-027272, filed on Feb. 10, 2010, the disclosure of which is hereby incorporated herein by reference in its entirety.

TECHNICAL FIELD

The present invention relates to a work vehicle and a method of controlling the same.

BACKGROUND ART

Some work vehicles such as the wheel loaders are embedded with a torque converter unit including a torque converter and a lock-up clutch. When the lock-up clutch is set to be in a decoupled state, the torque converter unit is configured to transmit driving force from an engine to a drive unit through the torque converter (this state will be hereinafter referred to as "a torqcon state"). When the lock-up clutch is set to be in a coupled state, by contrast, the torque converter unit is configured to transmit driving force from the engine to the drive unit through the lock-up clutch (this state will be hereinafter referred to as "a lock-up state"). Further, a control unit is herein configured to automatically switch the lock-up clutch between the coupled state and the decoupled state. For example, the control unit is configured to switch the lock-up clutch from the decoupled state to the coupled state when the vehicle speed reaches a predetermined switching speed (see Japan Laid-open Patent Application Publication No. JP-A-2009-103258). Immediately after starting moving at a low vehicle speed, in particular, the work vehicle is configured to travel in the torqcon state for preventing an engine stall.

SUMMARY

In the torque converter unit, however, torque transmission efficiency in the lock-up state is higher than that in the torqcon state. Therefore, the engine speed in the torqcon state becomes higher than that in the lock-up state in order to obtain the same acceleration speed for a given vehicle in both of the torqcon state and the lock-up state. Due to this, such a work vehicle has a drawback of inefficient fuel consumption when starting moving.

Further, work vehicles, equipped with a work instrument driven by means of driving force from an engine, are configured to use the driving force from the engine for both of the drive unit and the work instrument in executing a work using the work instrument when starts moving. When the driving force from the engine is not herein appropriately distributed, a variety of problems may be caused that include delay in engine speed increase, reduction in the action speed of the work instrument and etc.

It is an object of the present invention to appropriately distribute driving force from an engine to both of a drive unit and a work instrument at a higher transmission efficiency when a work vehicle starts moving in order to enhance fuel consumption, and simultaneously, inhibit delay in the engine speed increase and reduction in the action speed of the work instrument.

A work vehicle according to a first aspect of the present invention includes an engine, a drive unit, a hydraulic pump, a work instrument, a work instrument load detecting part, a torque converter unit and a control unit. The drive unit is configured to be driven by driving force from the engine for causing the work vehicle to travel. The hydraulic pump is configured to be driven by the driving force from the engine for discharging hydraulic oil. The work instrument is configured to be driven by the hydraulic oil from the hydraulic pump. The work instrument load detecting part is configured to detect a work instrument load information pertaining to a load of the work instrument. The torque converter unit includes a torque converter and a lock-up clutch. The lock-up clutch is configured to be switched among a coupled state, a slippage state and a decoupled state in accordance with a pressure of the hydraulic oil to be supplied thereto (hereinafter referred to as a lock-up hydraulic pressure). The torque converter unit is configured to transmit the driving force from the engine to the drive unit through either the torque converter or the lock-up clutch. The control unit is configured to control the lock-up hydraulic pressure for switching the lock-up clutch. The control unit is configured to execute a lock-up slippage control for switching the lock-up clutch into the slippage state (note the state will be hereinafter referred to as "a lock-up slippage state") when the work vehicle starts moving. The control unit is configured to control the lock-up hydraulic pressure based on the work instrument load information during execution of the lock-up slippage control.

A work vehicle according to a second aspect of the present invention relates to the work vehicle according to the first aspect of the present invention. In the work vehicle, the control unit is configured to control the lock-up hydraulic pressure for reducing the amount of torque to be transmitted by the lock-up clutch when the work instrument load information representing increase in a load of the work instrument is detected during execution of the lock-up slippage control.

A work vehicle according to a third aspect of the present invention relates to the work vehicle according to the first aspect of the present invention. In the work vehicle, the control unit is configured to set a target engine speed for the engine. The control unit is configured to modify the target engine speed based on the work instrument load information during execution of the lock-up slippage control.

A work vehicle according to a fourth aspect of the present invention relates to the work vehicle according to the third aspect of the present invention. The work vehicle further includes an engine speed detecting part and an accelerator operating member. The engine speed detecting part is configured to detect an engine speed. The accelerator operating member is operated by an operator. The control unit is configured to set the target engine speed in accordance with an operating amount of the accelerator operating member and control the engine for regulating the engine speed detected by the engine speed detecting part to approach the target engine speed during execution of a normal control without execution of the lock-up slippage control. Further, the control unit is configured to modify the target engine speed based on the work instrument load information and the operating amount of the accelerator operating member and control the engine for regulating the engine speed detected by the engine speed detecting part to approach the modified target engine speed during execution of the lock-up slippage control.

A work vehicle according to a fifth aspect of the present invention relates to the work vehicle according to the first aspect of the present invention. In the work vehicle, the work instrument includes a boom. The work instrument load detecting part is a boom operation detecting device configured to detect a position of a boom operating member for operating the boom. The work instrument load detecting part is configured to detect the position of the boom operating member as the work instrument load information.

A work vehicle according to a sixth aspect of the present invention relates to the work vehicle according to one of the first to fifth aspects of the present invention. In the work vehicle, the control unit is configured to calculate a thermal load of the lock-up clutch and finish executing the lock-up slippage control when the thermal load becomes greater than or equal to a predetermined threshold.

A method of controlling a work vehicle according to a seventh aspect of the present invention is a method of controlling a work vehicle including an engine, a drive unit, a hydraulic pump, a work instrument and a torque converter unit. The drive unit is configured to be driven by driving force from the engine for causing the work vehicle to travel. The hydraulic pump is configured to be driven by the driving force from the engine for discharging hydraulic oil. The work instrument is configured to be driven by the hydraulic oil from the hydraulic pump. The torque converter unit includes a torque converter and a lock-up clutch. The lock-up clutch is configured to be switched among a coupled state, a slippage state and a decoupled state in accordance with a lock-up hydraulic pressure indicating a pressure of the hydraulic oil to be supplied thereto. The torque converter unit is configured to transmit the driving force from the engine to the drive unit through either the torque converter or the lock-up clutch. The method of controlling a work vehicle includes the steps of: detecting a work instrument load information pertaining to a load of the work instrument; and executing a lock-up slippage control for switching the lock-up clutch into the slippage state when the work vehicle starts moving. Further, the lock-up hydraulic pressure is controlled based on the work instrument load information during execution of the lock-up slippage control.

According to the work vehicle of the first aspect of the present invention, the lock-up slippage control is executed for switching the lock-up clutch into the slippage state when the vehicle starts moving. Accordingly, torque transmission efficiency can be further enhanced than that achieved where the torqcon state is kept for a long period of time when the vehicle starts moving. Therefore, fuel consumption can be enhanced when the vehicle starts moving. Meanwhile, work vehicles may execute a work using the work instrument immediately after starting moving. In this case, increase in the engine speed is delayed when the large amount of torque is transmitted by the lock-up clutch. For example, the large amount of torque is transmitted by the lock-up clutch when the slippage amount of the lock-up clutch is small. Therefore, load acting on the engine as well as load acting on the work instrument is increased, and increase in the engine speed is delayed. In this case, increase in the rotation speed of the hydraulic pump is also delayed. Therefore, a problem is caused that an action of the work instrument is delayed. In view of the above, the work vehicle according to the first aspect of the present invention is configured to control the lock-up hydraulic pressure based on the work instrument load information during execution of the lock-up slippage control. Therefore, the amount of torque to be transmitted by the lock-up clutch can be controlled in consideration of load acting on the work instrument. Accordingly, it is possible to enhance fuel consumption when the vehicle starts moving, and simultaneously, inhibit delay in engine speed increase and reduction in the action speed of the work instrument.

According to the work vehicle of the second aspect of the present invention, the lock-up hydraulic pressure is controlled for reducing the amount of torque to be transmitted by the lock-up clutch when load acting on the work instrument is increased during execution of the lock-up slippage control. Accordingly, the engine speed is quickly increased and reduction in the action speed of the work instrument can be inhibited.

According to the work vehicle of the third aspect of the present invention, the target engine speed is modified based on the work instrument load information during execution of the lock-up slippage control. The engine speed can be thereby accurately controlled. Therefore, reduction in the action speed of the work instrument can be inhibited.

According to the work vehicle of the fourth aspect of the present invention, the target engine speed is modified based on the work instrument load information and the operating amount of the accelerator operating member during execution of the lock-up slippage control. Accordingly, it is possible to further inhibit reduction in the action speed of the work instrument.

According to the work vehicle of the fifth aspect of the present invention, the position of the boom operating member is detected as the work instrument load information. The position of the boom operating member is effective as the work instrument load information indicating increase in the load of the work instrument.

According to the work vehicle of the sixth aspect of the present invention, it is possible to inhibit reduction in the life duration of the lock-up clutch.

According to the method of controlling a work vehicle of the seventh aspect of the present invention, the lock-up slippage control is executed for switching the lock-up clutch into the slippage state when the vehicle starts moving. Accordingly, torque transmission efficiency can be further enhanced than that obtained where the torqcon state is kept for a long period of time when the vehicle starts moving. Therefore, fuel consumption can be enhanced when the vehicle starts moving. Meanwhile, work vehicles may execute a work using the work instrument immediately after starting moving. In this case, increase in the engine speed is delayed when the large amount of torque is transmitted by the lock-up clutch. For example, the large amount of torque is transmitted by the lock-up clutch when the slippage amount of the lock-up clutch is small. Therefore, load acting on the engine as well as load acting on the work instrument is increased, and increase in the engine speed is delayed. In this case, increase in the rotation speed of the hydraulic pump is also delayed. Therefore, a problem is caused that an action of the work instrument is delayed. In view of the above, in the method of controlling a work vehicle according to the seventh aspect of the present invention, the lock-up hydraulic pressure is controlled based on the work instrument load information during execution of the lock-up slippage control. Therefore, the amount of torque to be transmitted by the lock-up clutch can be controlled in consideration of load acting on the work instrument. Accordingly, it is possible to enhance fuel consumption when the vehicle starts moving, and simultaneously, inhibit delay in engine speed increase and reduction in the action speed of the work instrument.

DESCRIPTION OF THE EMBODIMENTS

Figure 1:
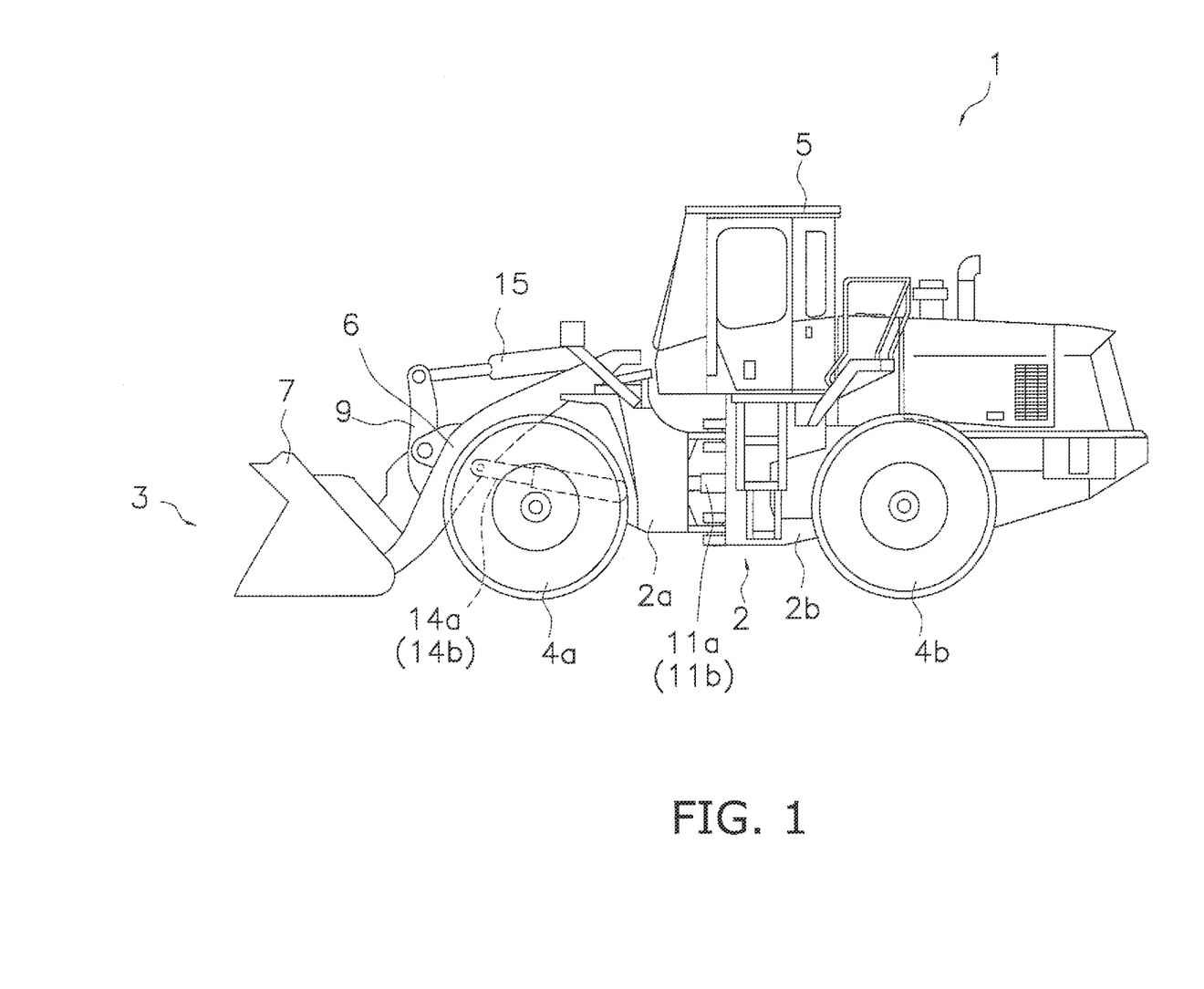
FIG. 1 is a side view of a work vehicle according to an exemplary embodiment of the present invention.
Figure 2:
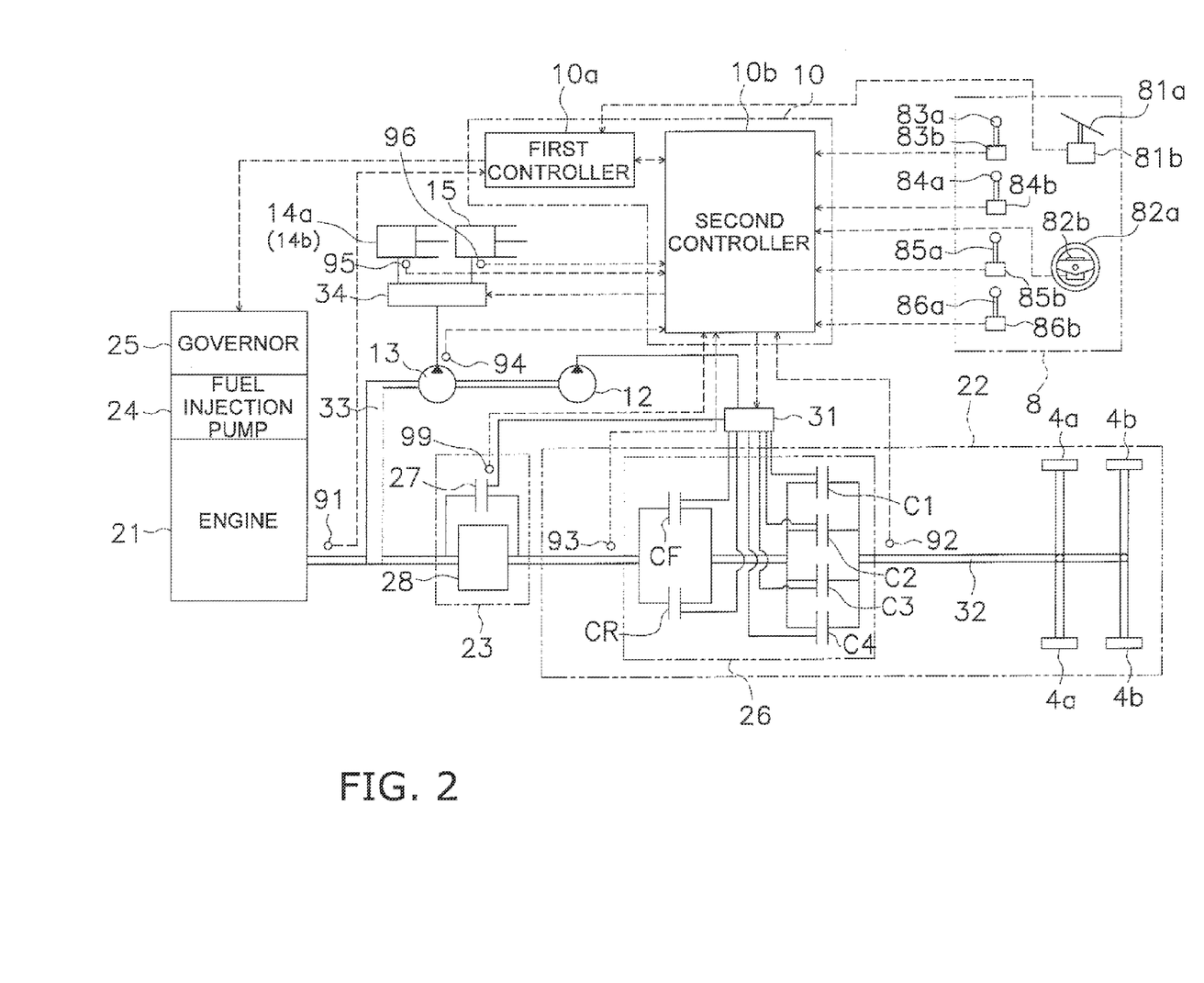
FIG. 2 is a schematic configuration diagram of the work vehicle.

FIGS. 1 and 2 illustrate a work vehicle 1 according to an exemplary embodiment of the present invention. FIG. 1 is an external view of the work vehicle 1, while FIG. 2 is a schematic configuration view of the work vehicle 1. The work vehicle 1 is a wheel loader. The work vehicle 1 can be self-propelled by rotational driving of front wheels 4a and rear wheels 4b. Further, the work vehicle 1 can perform a desired work using a work instrument 3.

As illustrated in FIG. 1, the work vehicle 1 includes a vehicle body frame 2, the work instrument 3, the front and rear wheels 4a and 4b and a cab 5.

The vehicle body frame 2 includes a front vehicle body part 2a and a rear vehicle body part 2b. The front and rear vehicle body parts 2a and 2b are coupled to each other while being pivotable in a transverse (right-and-left) direction. A pair of steering cylinders 11a and 11b is provided astride the front and rear vehicle body parts 2a and 2b. The steering cylinders 11a and 11b are hydraulic cylinders configured to be driven by means of hydraulic oil from a steering pump (not illustrated in the figures). In conjunction with extension and contraction of the steering cylinders 11a and 11b, the front vehicle body part 2a is configured to pivot with respect to the rear vehicle body part 2b. The travel direction of the vehicle is thereby changed. It should be noted that FIG. 1 illustrates only one of the steering cylinders 11a and 11b without illustrating the other thereof.

The work instrument 3 and a pair of the front wheels 4a are attached to the front vehicle body part 2a. The work instrument 3 is configured to be driven by means of the hydraulic oil from a work instrument pump 13 (see FIG. 2). The work instrument 3 includes a boom 6, a pair of lift cylinders 14a and 14b, a bucket 7 and a bucket cylinder 15. The boom 6 is attached to the front vehicle body part 2a. One ends of the lift cylinders 14a and 14b are attached to the front vehicle body part 2a. The other ends of the lift cylinders 14a and 14b are attached to the boom 6. The boom 6 is configured to pivot up and down in conjunction with extension and contraction of the lift cylinders 14a and 14b by means of the hydraulic oil from the work instrument pump 13. It should be noted that FIGS. 1 and 2 illustrate only one of the lift cylinders 14a and 14b without illustrating the other thereof. The bucket 7 is attached to the tip of the boom 6. One end of the bucket cylinder 15 is attached to the front vehicle body part 2a. The other end of the bucket cylinder 15 is attached to a bell crank 9. The bucket 7 is configured to pivot up and down through the bell crank 9 in conjunction with extension and contraction of the bucket cylinder 15 by means of the hydraulic oil from the work instrument pump 13.

The cab 5 and a pair of the rear wheels 4b are attached to the rear vehicle body part 2b. The cab 5 is mounted on the upper part of the vehicle body frame 2. The cab 5 includes a seat on which an operator is seated, an operating unit 8 to be described and etc. in the inside thereof.

As illustrated in FIG. 2, the work vehicle 1 further including an engine 21, a torque converter unit 23, a drive unit 22, a clutch pump 12, the work instrument pump 13, the operating unit 8, a control unit 10 and etc.

The engine 21 is a diesel engine, and the output thereof is controlled by regulating the fuel amount to be injected into a cylinder. The regulation is executed when an electronic governor 25 attached to a fuel injection pump 24 of the engine 21 is controlled by a first controller 10a to be described. An all-speed control governor is generally used as the governor 25 of the wheel loader. The governor 25 is configured to regulate the fuel injection amount in accordance with a load for regulating the actual engine speed of the engine 21 to be a target engine speed in accordance with an accelerator operating amount to be described. In other words, the governor 25 is configured to increase or reduce the fuel injection amount for eliminating deviation of the actual engine speed from the target engine speed. An engine speed sensor 91 (engine speed detecting part) is configured to detect the actual engine speed of the engine 21. A detection signal of the engine speed sensor 91 is inputted into the first controller 10a.

The torque converter unit 23 includes a lock-up clutch 27 and a torque converter 28. The lock-up clutch 27 is switchable among a coupled state, a slippage state and a decoupled state. When the lock-up clutch 27 is set to be in the decoupled state, the torque converter 28 is configured to transmit driving force from the engine 21 to the drive unit 22 by means of oil as a medium (i.e., the torqcon state). When the lock-up clutch 27 is set to be in the coupled state, the input and output sides of the torque converter 28 are directly connected. Driving force from the engine 21 is herein transmitted to the drive unit 22 through the lock-up clutch 27 (i.e., the lock-up state). When the lock-up clutch 27 is set to be in the slippage state, the driving force from the engine 21, transmitted to the drive unit 22 through the lock-up clutch 27, is reduced than that when the torque converter unit 23 is set to be in the lock-up state (i.e., the lock-up slippage state). The lock-up clutch 27 is a hydraulic actuation clutch configured to be actuated by means of the hydraulic oil from the clutch pump 12. The lock-up clutch 27 is configured to be selectively switched among the coupled state, the slippage state and the decoupled state in response to control of lock-up hydraulic pressure by a second controller 10b to be described through a clutch control valve 31. The lock-up hydraulic pressure herein refers to the pressure of the hydraulic oil to be supplied from the clutch pump 12 to the lock-up clutch 27. The lock-up hydraulic pressure is detected by a lock-up hydraulic pressure sensor 99. A detection signal from the lock-up hydraulic pressure sensor 99 is inputted into the second controller 10b.

The drive unit 22 is a device for causing the vehicle to travel by means of the driving force from the engine 21. The drive unit 22 includes a transmission 26 and the aforementioned front and rear wheels 4a and 4b and etc.

The transmission 26 includes a forward travel clutch CF corresponding to forward travel stages and a rearward travel clutch CR corresponding to rearward travel stages. The travel direction of the vehicle is configured to be switched between a forward direction and a rearward direction in conjunction with switching of the coupled state and the decoupled state of the respective clutches CF and CR. The vehicle is set to be in a neutral state when both of the clutches CF and CR are set to be in the decoupled state. Further, the transmission 26 includes a plurality of speed stage clutches C1 to C4 corresponding to a plurality of speed stages. Thus, the transmission 26 can switch a reduction ratio in a plurality of levels. For example, the transmission 26 includes four speed stage clutches C1 to C4 and can switch back and forth the first to fourth speed stages in four levels. The clutches CF and CR and the speed stage clutches C1 to C4 are respectively hydraulic actuation type hydraulic clutches. The hydraulic oil is supplied from the clutch pump 12 to the respective clutches CF, CR and C1-C4 through the clutch control valve 31. The clutches CF, CR and C1-C4 are respectively switched between the coupled state and the decoupled state when the clutch control valve 31 is controlled by the second controller 10b and supply of the hydraulic oil to the clutches CF, CR and C1-C4 are controlled.

A T/M output rotation speed sensor 92 is attached to an output shaft of the transmission 26 in order to detect the rotation speed of the output shaft of the transmission 26. A detection signal from the T/M output rotation speed sensor 92 is inputted into the second controller 10b. The second controller 10b is configured to calculate the vehicle speed based on the detection signal from the T/M output rotation speed sensor 92. Therefore, the T/M output rotation speed sensor 92 functions as a vehicle speed sensor for detecting the vehicle speed. It should be noted that a sensor for detecting the rotation speed of the other part except for the output shaft of the transmission 26 may be used as the vehicle speed sensor. Driving force, outputted from the transmission 26, is transmitted to the front and rear wheels 4a and 4b through a shaft 32 and etc. With the configuration, the vehicle is configured to travel. The rotation speed of an input shaft of the transmission 26 is detected by a TIM input rotation speed sensor 93. A detection signal from the T/M input rotation speed sensor 93 is inputted into the second controller 10b.

The driving force of the engine 21 is partially transmitted to the work instrument pump 13 and the clutch pump 12 through a PTO shaft 33. The work instrument pump 13 and the clutch pump 12 are hydraulic pumps configured to be driven by the driving force from the engine 21. The hydraulic oil, discharged from the work instrument pump 13, is supplied to the lift cylinders 14a and 14b and the bucket cylinder 15 through a work instrument control valve 34. Therefore, the work instrument 3 is configured to be driven by a part of the driving force from the engine 21. Further, the hydraulic oil, discharged from the clutch pump 12, is supplied to the various types of clutches 27, CF, CR and C1-C4 through the clutch control valve 31.

The pressure of the hydraulic oil discharged from the work instrument pump 13 (hereinafter referred to as "work instrument pump hydraulic pressure") is detected by a first hydraulic pressure sensor 94. The pressure of the hydraulic oil supplied to the lift cylinders 14a and 14b (hereinafter referred to as "lift cylinder hydraulic pressure") is detected by a second hydraulic pressure sensor 95. Specifically, the second hydraulic pressure sensor 95 is configured to detect the hydraulic pressure in a lift cylinder bottom chamber to which the hydraulic oil is supplied in extending the lift cylinder 14a/14b. The pressure of the hydraulic oil supplied to the bucket cylinder 15 (hereinafter referred to as "bucket cylinder hydraulic pressure") is detected by a third hydraulic pressure sensor 96. Specifically, the third hydraulic pressure sensor 96 is configured to detect the hydraulic pressure in a bucket cylinder bottom chamber to which the hydraulic oil is supplied in extending the bucket cylinder 15. Detection signals from the first to third hydraulic pressure sensors 94 to 96 are inputted into the second controller 10b.

The operating unit 8 is operated by an operator. The operating unit 8 includes an accelerator operating member 81a, an accelerator operation detecting device 81b, a steering operating member 82a, a steering operation detecting device 82b, a boom operating member 83a, a boom operation detecting device 83b, a bucket operating member 84a, a bucket operation detecting device 84b, a speed-stage shifting member 85a, a speed-stage shifting detecting device 85b, a FR operating member 86a, a FR operation detecting device 86b and etc.

The accelerator operating member 81a is an accelerator pedal, for instance, and is operated for setting a target engine speed of the engine 21. The accelerator operation detecting device 81b (accelerator operation detecting part) is configured to detect the operating amount of the accelerator operating member 81a (hereinafter referred to as "the accelerator operating amount") using an angular sensor embedded therein (not illustrated in the figures). The accelerator operation detecting device 81b is configured to output a detection signal to the first controller 10a.

The steering operating member 82a is a steering handle, for instance, and is operated for controlling the travel direction of the vehicle. The steering operation detecting device 82b is configured to detect the position of the steering operating member 82a and output a detection signal to the second controller 10b. The second controller 10b is configured to control the hydraulic pressure to be supplied to the steering cylinders 11a and 11b (see FIG. 1) based on the detection signal from the steering operation detecting device 82b. The steering cylinders 11a and 11b are thereby extended and contracted, and the travel direction of the vehicle is changed.

The boom operating member 83a and the bucket operating member 84a are operating levers, for instance, and are operated for actuating the work instrument 3. Specifically, the boom operating member 83a is operated for actuating the boom 6. The bucket operating member 84a is operated for actuating the bucket 7. The boom operation detecting device 83b (a boom operating lever position detecting part) is configured to detect the position of the boom operating member 83a (hereinafter referred to as "a boom operating lever position") by means of an angular sensor embedded therein (not illustrated in the figures). The bucket operation detecting device 84b (a bucket operating lever position detecting part) is configured to detect the position of the bucket operating member 84a (hereinafter referred to as "a bucket operating lever position") by means of an angular sensor embedded therein (not illustrated in the figures). The boom operation detecting device 83b and the bucket operation detecting device 84b are configured to output detection signals to the second controller 10b. The second controller 10b is configured to control the work instrument control valve 34 based on the detection signals from the boom operation detecting device 83b and the bucket operation detecting device 84b. Accordingly, the lift cylinders 14a and 14b and the bucket cylinder 15 are extended and contracted, and the boom 6 and the bucket 7 are thereby actuated.

The speed-stage shifting member 85a is, for instance, a shift lever. The speed-stage shifting member 85a is operated for setting the upper limit of the speed stages (hereinafter referred to as "a maximum speed stage"). The speed-stage shifting detecting device 85b is configured to detect the position of the speed-stage shifting member 85a. The speed-stage shifting detecting device 85b is configured to output a detection signal to the second controller 10b. The second controller 10b is configured to control shifting of the speed stages of the transmission 26 based on the detection signal from the speed-stage shifting detecting device 85b.

The FR operating member 86a is operated for switching travelling of the work vehicle 1 between forward travelling and rearward travelling. The FR operating member 86a is switched among a forward travel position, a neutral position and a rearward travel position. The FR operation detecting device 86b is configured to detect the position of the FR operating member 86a. The FR operation detecting device 86b is configured to output a detection signal to the second controller 10b. The second controller 10b is configured to control the clutch control valve 31 based on the detection signal from the FR operation detecting device 86b. Accordingly, the forward travelling clutch CF and the rearward travelling clutch CR are controlled and the vehicle is switched among a forward travel state, a rearward travel state and a neutral state.

The control unit 10 includes the first controller 10a and the second controller 10b. Each of the first and second controllers 10a and 10b can be realized by a computer including a storage device to be used as a program memory or a work memory, for instance, and a CPU configured to run programs.

Figure 3:
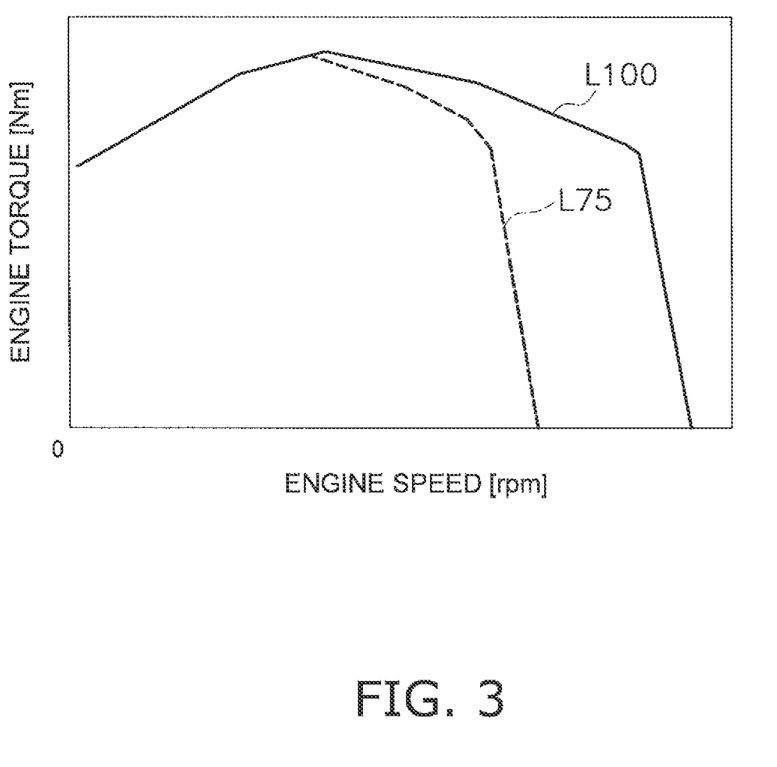
FIG. 3 is a chart representing an exemplary engine torque curve.

The first controller 10a is configured to transmit an engine command signal to the governor 25 for achieving a target engine speed in accordance with the accelerator operating amount. The engine 21 is controlled based on an engine torque curve defining a relation between the engine speed and the output torque of the engine 21 (hereinafter referred to as "engine torque"). More specifically, the engine torque curve expresses the maximum output torque that can be outputted from the engine 21 in accordance with the engine speed (hereinafter referred to as "a torque upper limit value"). Exemplary torque curves, represented in FIG. 3, will be herein explained. An engine torque curve L100 is an engine torque curve where the accelerator operating amount is 100%. For example, the engine torque curve L100 corresponds to the rated or maximum power output of the engine 21. The accelerator operating amount of 100% herein refers to a state that the accelerator operating member 81a is maximally operated. An engine torque curve L75 is an engine torque curve where the accelerator operating amount is 75%. The governor 25 is configured to control the output of the engine 21 for regulating a value of the engine torque to be equal to or less than that on the engine torque curve. The output of the engine 21 is controlled, for instance, by controlling the upper limit value of the amount of fuel to be injected into the engine 21. Further, the first controller 10a is configured to receive a modification command signal from the second controller 10b while a lock-up slippage control to be described is executed. The first controller 10a is configured to modify a command value of the engine command signal in response to the modification command signal and transmit the engine command signal with the modified command value to the governor 25.

The second controller 10b is configured to control the transmission 26 and the torque converter unit 23 in accordance with the travel state of the vehicle. The second controller 10b is configured to automatically shift the speed stages of the transmission 26 and switch the lock-up clutch 27 in accordance with the vehicle speed. Specifically, after the work vehicle 1 starts moving, the power transmission state is sequentially shifted to the second speed torqcon state, a second speed lock-up slippage state, a second speed lock-up state, a third speed torqcon state, a third speed lock-up state, a fourth speed torqcon state and a fourth speed lock-up state in this order in accordance with increase in the vehicle speed. For example, the second speed torqcon state refers to a power transmission state where the speed stage of the transmission 26 is a second speed while the lock-up clutch 27 is set to be in the decoupled state. The second speed lock-up state refers to a power transmission state where the speed stage of the transmission 26 is the second stage while the lock-up clutch 27 is set to be in the coupled state. Further, the second speed lock-up slippage state refers to a power transmission state where the speed stage of the transmission 26 is the second speed and the lock-up clutch 27 is set to be in the slippage state. Likewise, the other power transmission states are defined based on the combinations of the speed stages of the transmission 26 and the states of the lock-up clutch 27.

It should be noted that, where the third speed is set as the maximum speed stage, the power transmission state is configured to be shifted within a range from the second speed torqcon state to the third speed lock-up state. Where the second speed is set as the maximum speed stage, the power transmission state is configured to be shifted within a range from the second speed torqcon state to the second speed lock-up state. When a shift-down member (not illustrated in the figures) is operated at the second speed stage, the transmission 26 is switched into a first torqcon state. Further, prevention of switching into the lock-up states can be set using a lock-up function setting member (not illustrated in the figures). In this case, the second controller 10b is configured to sequentially shift the power transmission state to the second speed torqcon state, the third speed torqcon state and the fourth speed torqcon state in accordance with increase in the vehicle speed.

In addition to the aforementioned detection signals, detection signals regarding the inlet and outlet pressures of the torque converter unit 23 and etc. are inputted into the second controller 10b. Further, the first and second controllers 10a and 10b can be communicated with each other through the wire/wireless communication. The first controller 10a is configured to input detection signals regarding the actual engine speed of the engine 21, the fuel injection amount, the accelerator operating amount and etc. into the second controller 10b. In the lock-up slippage control to be described, the second controller 10b is configured to calculate a modified value for modifying the command value of the engine command signal based on the aforementioned signals. The second controller 10b is configured to transmit a modification command signal corresponding to the modified value to the first controller 10a.

The second controller 10b is configured to execute the lock-up slippage control for setting the lock-up clutch 27 to be in the slippage state when an operation is executed for causing the work vehicle 1 to start moving. Specifically, the lock-up slippage control is executed when the FR operating member 86a is switched from the rearward travel position to the forward travel position or vice versa, and simultaneously, the accelerator operating amount is greater than or equal to a predetermined amount. The lock-up slippage control will be hereinafter explained based on a flowchart represented in FIG. 4. It should be noted the lock-up slippage control will be explained based on a series of operational steps of: firstly causing the stopped work vehicle 1 to start moving backwards; switching the travel direction of the work vehicle 1 into the forward direction after a while; and lifting up the bucket 7 during forward travelling of the work vehicle 1.

Figure 5:
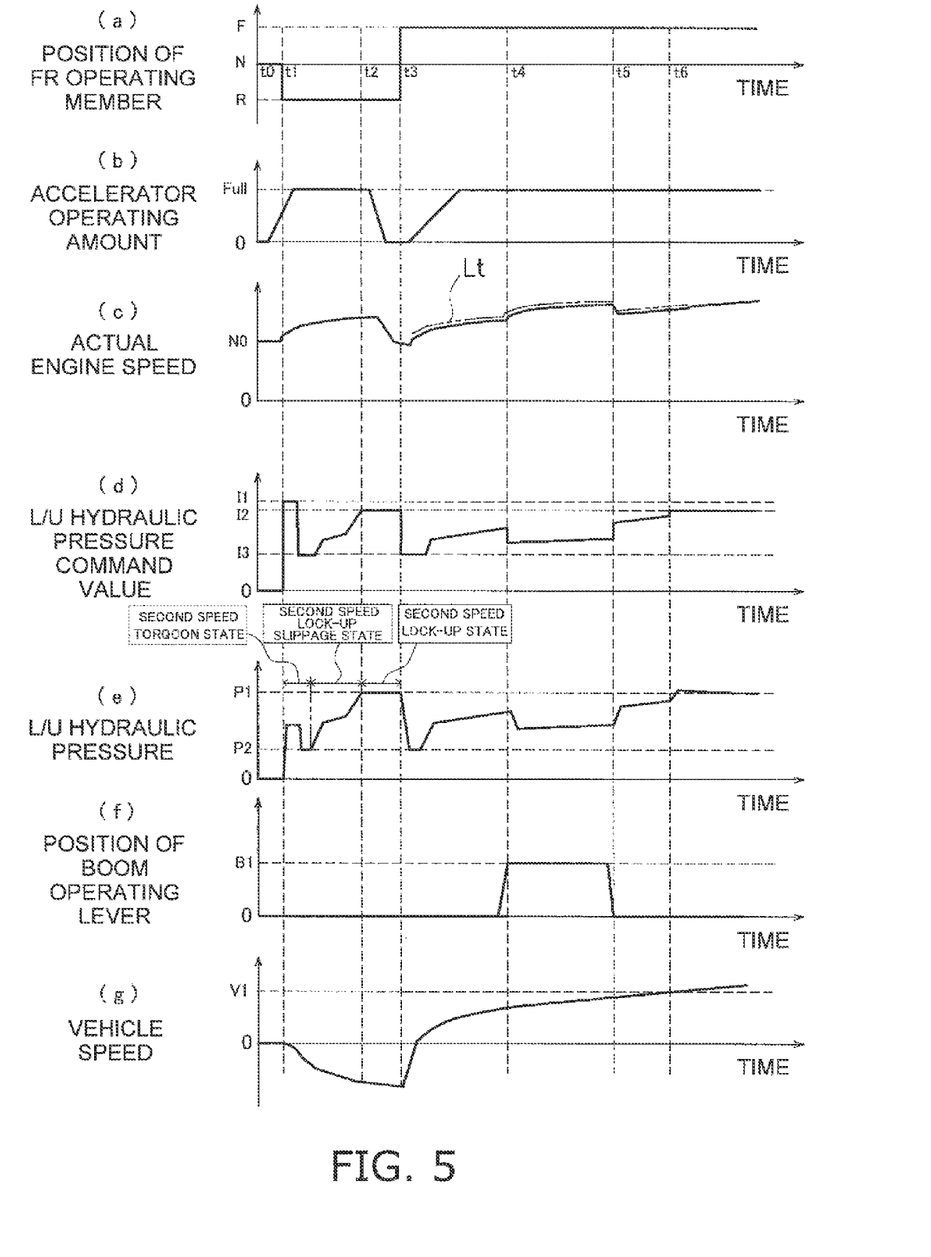
FIG. 5 includes timing charts representing actions of respective components in the lock-up slippage control.

In a first step S1, a lock-up hydraulic pressure (L/U hydraulic pressure) command value is increased to an initial value (t1 in FIG. 5A is set as a starting point). To quickly filling up the lock-up clutch 27 with the hydraulic oil, the second controller 10b increases the lock-up hydraulic pressure command value to be transmitted to the clutch control valve 31 to the initial value (see a command value I1 in FIG. 5D). The second controller 10b then reduces the lock-up hydraulic pressure command value to a value less than the initial value (see a command value I3 in FIG. 5D). Through the aforementioned processes, the lock-up clutch 27 is filled up with the hydraulic oil. When filling up the lock-up clutch 27 with the hydraulic oil is completed, the lock-up clutch 27 is set to be in the slippage state. The processing proceeds to a second step S2 while the second controller 10b gradually increases the lock-up hydraulic pressure command value. It should be noted that the lock-up clutch 27 keeps the decoupled state until filling up the lock-up clutch 27 with the hydraulic oil is completed after the work vehicle 1 starts moving. In other words, the work vehicle 1 is configured to travel in a second speed torqcon state until the lock-up clutch 27 is switched into the slippage state after the work vehicle 1 starts moving. On the other hand, the process of the first step S1 is omitted when filling up the lock-up clutch 27 with the hydraulic oil has been already completed in executing an operation of causing the work vehicle 1 to start moving.

Figure 4:
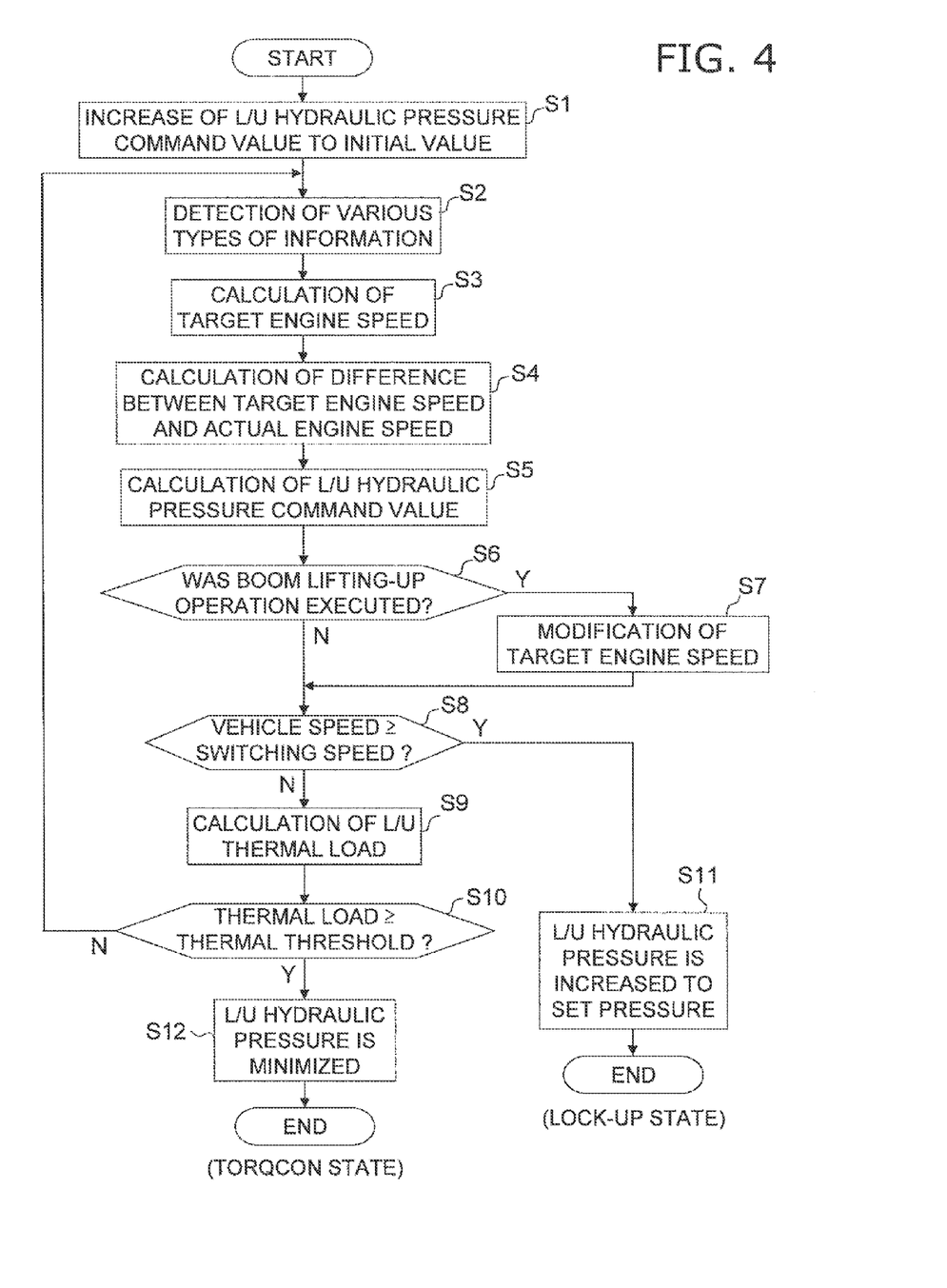
FIG. 4 is a flowchart representing a processing to be executed in a lock-up slippage control.

In the second step S2, various types of information are detected. The various types of information are herein transmitted to the first and second controllers 10a and 10b in the form of the aforementioned various detection signals. For example, information of a boom operating lever position and that of a bucket operating lever position are transmitted, in the form of detection signals, to the second controller 10b. Further, information of the accelerator operating amount and that of the actual engine speed of the engine 21 are transmitted, in the form of detection signals, to the second controller 10b through the first controller 10a.

In a third step S3, a target engine speed of the engine 21 is calculated. The first controller 10a herein calculates the target engine speed in accordance with the accelerator operating amount.

In a fourth step S4, difference between the target engine speed and the actual engine speed of the engine 21 is calculated. The second controller 10b herein calculates difference between the target engine speed of the engine 21 calculated in the third step S3 and the actual engine speed of the engine 21 detected by the engine speed sensor 91.

In a fifth step S5, a command value of the lock-up hydraulic pressure is calculated. The second controller 10b herein calculates the lock-up hydraulic pressure for regulating the actual engine speed of the engine 21 to be matched with the target engine speed and transmit the calculated lock-up hydraulic pressure in the form of a command signal to the clutch control valve 31. For example, the lock-up hydraulic pressure is increased when the actual engine speed of the engine 21 is greater than the target engine speed thereof. The slippage amount of the lock-up clutch 27 is thereby reduced and the amount of torque to be transmitted by the lock-up clutch 27 is increased. As a result, the actual engine speed of the engine 21 is reduced and gets closer to the target engine speed. By contrast, the lock-up hydraulic pressure is reduced when the actual engine speed of the engine 21 is less than the target engine speed. The slippage amount of the lock-up clutch 27 is thereby increased and the amount of torque to be transmitted by the lock-up clutch 27 is reduced. As a result, the actual engine speed of the engine 21 is increased and gets closer to the target engine speed.

In a sixth step S6, it is determined whether or not an operation was executed for lifting up the boom 6. The second controller 10b herein determines whether or not the boom operating member 83a was operated for lifting up the boom 6 based on a position of the boom operating lever. The processing proceeds to a seventh step S7 when the operation was executed for lifting up the boom 6. On the other hand, the processing proceeds to an eighth step S8 when the operation has not been executed for lifting up the boom 6.

In the seventh step S7, the target engine speed of the engine 21 is modified. The second controller 10b herein calculates a modified value for increasing the target engine speed based on the boom operating lever position and the accelerator operating amount. The second controller 10b transmits the modified value in the form of a modification command signal to the first controller 10a. The first controller 10a modifies the command value corresponding to the engine command signal based on the modification command signal from the second controller 10b. Accordingly, the target engine speed of the engine 21 is modified based on the boom operating lever position and the accelerator operating amount. For example, in calculating the modified value, the second controller 10b increases the modified value in proportion to magnitude of the operating amount of lifting up the boom 6. By contrast, in calculating the modified value, the second controller 10b reduces the modified value in inverse proportion to magnitude of the operating amount of lifting up the boom 6. It should be noted that the second controller 10b stores a map indicating the relation among the boom operating lever position, the accelerator operating amount and the modified value of the target engine speed. The second controller 10b determines the modified value based on the map. Alternatively, the modified value may be determined based on a table or a formula instead of the map. During execution of the lock-up slippage control, the lock-up hydraulic pressure is calculated for regulating the actual engine speed of the engine 21 to be matched with the target engine speed in the fifth step S5 as described above. Therefore, when the target engine speed of the engine 21 is modified based on the operating amount of lifting up the boom 6, the lock-up hydraulic pressure is controlled for regulating the actual engine speed of the engine 21 to be matched with the modified target engine speed. Therefore, the second controller 10b controls the lock-up hydraulic pressure based on the operating amount of lifting up the boom 6 during execution of the lock-up slippage control. For example, the second controller 10b reduces the lock-up hydraulic pressure when an operation of the boom operating member 83a for lifting up the boom 6 is detected during execution of the lock-up slippage control. Accordingly, the amount of torque to be transmitted by the lock-up clutch 27 is reduced and the actual engine speed of the engine 21 is increased.

In an eighth step S8, it is determined whether or not the vehicle speed is greater than or equal to a switching speed. The second controller 10b herein determines whether or not the vehicle speed becomes greater than or equal to the switching speed at which the second speed lock-up slippage state is switched into the second speed lock-up state. When the vehicle speed is greater than or equal to the switching speed, the processing proceeds to an eleventh step S11. In the eleventh step S11, the lock-up hydraulic pressure is increased to a set pressure (see P1 in FIG. 5E). The second controller 10b herein transmits a command signal (see I2 in FIG. 5D) to the clutch control valve 31 for regulating the lock-up hydraulic pressure to be matched with the set pressure. The set pressure herein refers to the lock-up hydraulic pressure at which the lock-up clutch 27 is set to be in the coupled state. Therefore, the lock-up clutch 27 is switched from the slippage state to the coupled state, and the work vehicle 1 travels in the second speed lock-up state. In other words, the lock-up slippage control is finished. When it is determined in the eighth step S8 that the vehicle speed is not greater than or equal to the switching speed, the processing proceeds to a ninth step S9.

In the ninth step S9, a thermal load of the lock-up clutch 27 is calculated. The second controller 10b herein calculates the thermal load of the lock-up clutch 27 based on the lock-up hydraulic pressure, the slippage speed of the lock-up clutch 27, a period of time while the lock-up clutch 27 keeps the slippage state and etc.

In a tenth step S10, it is determined whether or not the thermal load is greater than or equal to a predetermined thermal threshold. The second controller 10b herein determines whether or not the thermal load of the lock-up clutch 27, calculated in the ninth step S9, is greater than or equal to the predetermined thermal threshold. The predetermined thermal threshold is set in terms of protecting the lock-up clutch 27 from being damaged by frictional heat. When it is determined that the thermal load is greater than or equal to the predetermined thermal threshold, the processing proceeds to a twelfth step S12. Specifically, the second controller 10b reduces the lock-up hydraulic pressure to the minimum pressure when the thermal load becomes greater than or equal to the predetermined thermal threshold. Accordingly, the work vehicle 1 is switched into the second speed torqcon state, and the lock-up slippage control is finished. When it is determined that the thermal load is not greater than or equal to the predetermined thermal threshold, the processing proceeds to the second step S2. In other words, the second controller 10b continues the lock-up slippage control either until the vehicle speed reaches the switching speed or until the thermal load becomes greater than or equal to the predetermined thermal threshold.

Next, control of the lock-up clutch 27 executed when the work vehicle 1 starts moving will be explained based on timing charts represented in FIG. 5. FIG. 5A represents positional change of the FR operating member 86a. It should be noted that the speed-stage shifting member 85a is herein assumed to be positioned in the second speed position. In other words, the speed stage of the transmission 26 is herein fixed to the second speed. FIG. 5B represents variation in the accelerator operating amount. FIG. 5C represents variation in the actual engine speed of the engine 21. FIG. 5D represents variation in the lock-up hydraulic pressure command value. In other words, FIG. 5D represents variation in a command current value to be transmitted to the clutch control valve 31. FIG. 5E represents variation in the lock-up hydraulic pressure. FIG. 5F represents positional change of the boom operating lever. FIG. 5G represents variation in the vehicle speed of the work vehicle 1.

First, at a time point t0, the FR operating member 86a is set to be in the neutral position while the accelerator operating amount is zero and the vehicle speed is also zero. In other words, the work vehicle 1 stops moving. The actual engine speed of the engine 21 is kept at an idling engine speed N0. The lock-up hydraulic pressure command value is zero, and the lock-up hydraulic pressure is also zero. Therefore, the lock-up clutch 27 is set to be in the decoupled state. Further, the boom operating member 83a is set to be in the neutral position without being operated. It should be herein noted that the bucket operating member 84a is also assumed not to be operated.

At a time point t1, the actual engine speed of the engine 21 is beginning to increase when the FR operating member 86a is switched from the neutral position to the rearward travel position and the accelerator operating member 81a is operated. Further, the lock-up hydraulic pressure command value is set to be the initial value I1. The lock-up hydraulic pressure thereby begins to increase. Subsequently, the vehicle speed to the rearward begins to increase a little behind the time point t1. The work vehicle 1 thereby starts moving backwards. The work vehicle 1 herein travels in the second speed torqcon state. When the lock-up hydraulic pressure then reaches a set pressure P1 at a time point t2, the lock-up clutch 27 is switched into the coupled state. The work vehicle 1 thereby travels in the second speed lock-up state.

At a time point t3, the accelerator operating amount is reduced to zero while the FR operating member 86a is switched from the rearward travel position to the forward travel position. When the accelerator operating amount is then gradually increased, the vehicle speed in the forward direction is gradually increased. In other words, the work vehicle 1 starts moving forwards. The lock-up hydraulic pressure command value is herein reduced from the command value 12 corresponding to the set pressure to a command value 13. The command value 13 corresponds to a lock-up pressure P2 corresponding to the internal pressure of the torque converter 28. Accordingly, the lock-up clutch 27 is quickly switched from the coupled state to the slippage state. As a result, the work vehicle 1 travels in the second speed lock-up slippage state. Further, the lock-up hydraulic pressure is controlled for regulating the actual engine speed of the engine 21 to be matched with the target engine speed (see a dashed two-dotted line Lt in FIG. 5C).

When a lifting-up operation of the boom operating member 83a is detected at a time point t4, the lock-up hydraulic pressure command value is reduced and the lock-up hydraulic pressure is thereby reduced. Accordingly, the actual engine speed of the engine 21 is increased. It should be noted that the lock-up clutch 27 herein keeps the slippage state and the work vehicle 1 keeps the second speed lock-up slippage state.

When the lifting-up operating amount of the boom operating member 83a becomes zero at a time point t5, i.e., when the boom operating member 83a is returned to the neutral position, the lock-up hydraulic pressure command value is increased and the lock-up hydraulic pressure is thereby increased. Accordingly, the actual engine speed of the engine 21 is reduced. Further, the lock-up clutch 27 also herein keeps the slippage state and the work vehicle 1 keeps the second speed lock-up slippage state.

When the vehicle speed reaches a switching speed V1 at a time point t6, the lock-up hydraulic pressure command value is increased to the set pressure command value 12. The lock-up hydraulic pressure is thereby increased to the set pressure P1 and the lock-up clutch 27 is switched from the slippage state to the coupled state. As a result, the work vehicle 1 travels in the second speed lock-up state. It should be noted that the actual engine speed of the engine 21 is increased from the time point t3 to the time point t6 under the control of the lock-up hydraulic pressure but the work vehicle 1 continues accelerating (see FIG. 5G).

Figure 6:
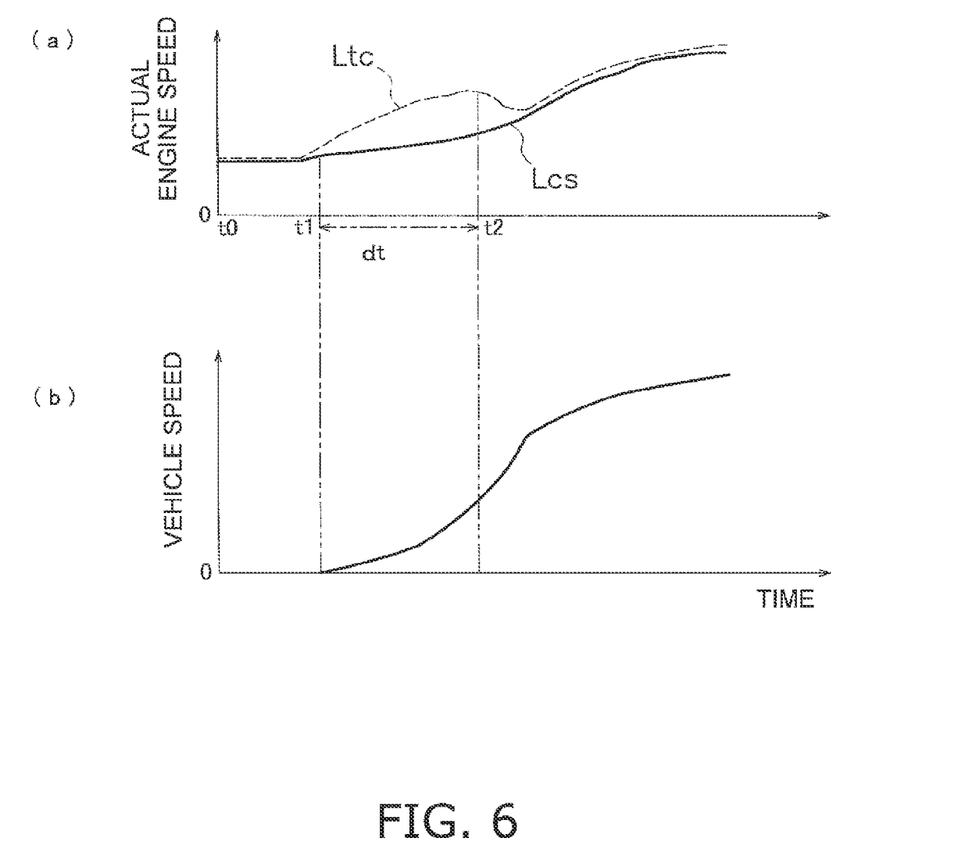
FIG. 6 includes timing charts representing variation in engine speed in a lock-up slippage state and variation in engine speed in a torqcon state when the work vehicle starts moving.

As described above, the work vehicle 1 according to the present exemplary embodiment of the present invention is configured to execute the lock-up slippage control for setting the lock-up clutch 27 to be in the slippage state when starting moving. Therefore, as represented in FIG. 6, especially in a time period (dt) until the second speed lock-up slippage state is finished after the work vehicle 1 starts moving, the engine speed can be inhibited to a lower level in engine speed variation (a solid line Lcs) where the second speed lock-up slippage state is executed, compared to in engine speed variation (a broken line Ltc) where a well-known control of directly shifting the second speed torqcon state to the second speed lock-up state is executed.

Meanwhile, in some cases, a work instrument is generally operated while a work vehicle starts moving and accelerates. For example, a boom may be lifted up while a work vehicle forwardly moves toward a truck in order to put luggage held by a bucket onto the truck. When increase in the actual engine speed is herein inhibited, increase in the rotation speed of a work instrument pump is also inhibited. A drawback is produced that the lifting-up speed of the boom slows down.

By contrast, in the work vehicle 1 of the present exemplary embodiment of the present invention, the lock-up hydraulic pressure is controlled based on the operating amount of lifting up the boom 6 during execution of the lock-up slippage control. Specifically, the lock-up hydraulic pressure is controlled for reducing the amount of torque to be transmitted by the lock-up clutch 27 when the operation of lifting up the boom 6 is detected during execution of the lock-up slippage control. The actual engine speed of the engine 21 is thereby increased while the operation of lifting up the boom 6 is executed. Accordingly, it is possible to prevent reduction in the lifting-up speed of the boom 6.

It should be noted that the second controller 10b transmits a command of supplying the hydraulic oil for extending the lift cylinders 14a and 14b to the work instrument control valve 34 when the operation of lifting up the boom 6 is executed through the boom operating member 83a. As a result, the lift cylinders 14a and 14b are extended and the boom 6 is thereby lifted up. Load acting on the work instrument 3 is herein much larger than that when the other actions are performed. Therefore, the boom operating lever position is effective as the work instrument load information indicating increase in the load acting on the work instrument 3. Further, the boom operation detecting device 83b, configured to detect the position of the boom operating member 83a, herein functions as a work instrument load detecting part configured to detect the work instrument load information.

Further, the work vehicle 1 according to the present exemplary embodiment of the present invention is configured to modify the target engine speed of the engine 21 based on the operating amount of lifting up the boom during execution of the lock-up slippage control. As a result, the lock-up hydraulic pressure is controlled. Therefore, the actual engine speed of the engine 21 can be accurately controlled. Put the above together, it is possible to enhance fuel consumption when the work vehicle 1 starts moving, and simultaneously, inhibit delay of engine speed increase and reduction in the action speed of the work instrument 3.

The work vehicle 1 according to the present exemplary embodiment of the present invention is configured to calculate thermal load of the lock-up clutch 27 and finish the lock-up slippage control when the thermal load becomes greater than or equal to a predetermined thermal threshold. Accordingly, it is possible to inhibit reduction in the life duration of the lock-up clutch 27.

An exemplary embodiment of the present invention has been explained above. However, the present invention is not limited to the aforementioned exemplary embodiment, and a variety of changes can be herein made without departing from the scope of the present invention.

In the work vehicle 1 according to the aforementioned exemplary embodiment, the first and second controllers 10a and 10b are separately provided. However, the first and second controllers 10a and 10b may be integrated. For example, functions of the first and second controllers 10a and 10b may be implemented by a single computer. By contrast, a function of the first controller 10a or that of the second controller 10b may be shared by a plurality of computers.

The aforementioned various types of operating members may not be limited to members such as pedals and levers as exemplified above. Alternatively, dials and switches may be used as the members.

The speed stages of the transmission 26 are not limited to the first to fourth speeds. The number of shiftable speed stages may be greater or less than four. Further, the pattern of shifting the speed stages of the transmission 26 by the second controller 10b is not limited to that described above. For example, the speed stages may be sequentially shifted from the first speed in accordance with increase in the speed.

In the aforementioned exemplary embodiment, the target engine speed of the engine 2 is modified based on the operating amount of lifting up the boom during execution of the lock-up slippage control. However, a command value of the lock-up hydraulic pressure may be calculated correspondingly to the operating amount of lifting up the boom and the calculated command value may be inputted into the clutch control valve 31. In this case, the second controller 10b is configured to calculate the command value of the lock-up hydraulic pressure based on a map, a table or a formula, which represents correspondence between the operating amount of lifting up the boom and the command value of the lock-up hydraulic pressure. For example, the command value is calculated correspondingly to the lock-up hydraulic pressure that is reduced in proportion to magnitude of the operating amount of lifting up the boom.

The work instrument load information is not limited to the boom operating lever position. Any other parameter may be used as the work instrument load information, as long as it relates to load of the work instrument 3. Exemplary parameters regarding load of the work instrument 3 include the boom operating lever position, the bucket operating lever position, the work instrument pump hydraulic pressure, the lift cylinder hydraulic pressure and the bucket cylinder hydraulic pressure. Amongst the parameters, for example, the work instrument pump hydraulic pressure may be used as the work instrument load information. Alternatively, the combination of the boom operating lever position and the bucket operating lever position may be used as the work instrument load information. Further alternatively, the combination of two or more of the parameters including the work instrument pump hydraulic pressure, the lift cylinder hydraulic pressure and the bucket cylinder hydraulic pressure may be used as the work instrument load information. Yet further alternatively, the combination of the boom operating lever position, the bucket operating lever position and the aforementioned various hydraulic pressures may be used as the work instrument load information. The second controller 10b is configured to determine the command value of the lock-up hydraulic pressure based on a map, a table or a formula, which represents the correspondence between the work instrument load information and the command value of the lock-up hydraulic pressure. It should be noted that the boom operation detecting device 83b corresponds to the work instrument load detecting part when the boom operating lever position is detected as the work instrument load information. On the other hand, the bucket operation detecting device 84b corresponds to the work instrument load detecting part when the bucket operating lever position is detected as the work instrument load information. The first hydraulic pressure sensor 94 corresponds to the work instrument load detecting part when the work instrument pump hydraulic pressure is detected as the work instrument load information. The second hydraulic pressure sensor 95 corresponds to the work instrument load detecting part when the lift cylinder hydraulic pressure is detected as the work instrument load information. The third hydraulic pressure sensor 96 corresponds to the work instrument load detecting part when the bucket cylinder hydraulic pressure is detected as the work instrument load information.

In the aforementioned exemplary embodiment, the lock-up slippage control is executed when the work vehicle starts moving forwards and accelerates. However, the lock-up slippage control may be executed when the work vehicle starts moving rearwards and accelerates.

The illustrated embodiment has an advantageous effect of enhancing fuel consumption when a work vehicle starts moving. Therefore, the illustrated embodiment is effective as a work vehicle and a method of controlling the work vehicle.

The invention claimed is:

1. A work vehicle, comprising:
   an engine;
   a drive unit configured to be driven by driving force from the engine for causing the work vehicle to travel;
   a hydraulic pump configured to be driven by the driving force from the engine for discharging hydraulic oil;
   a work instrument configured to be driven by the hydraulic oil from the hydraulic pump;
   a work instrument load detecting part configured to detect a work instrument load information pertaining to a load of the work instrument;
   a torque converter unit including a torque converter and a lock-up clutch, the lock-up clutch being configured to be switched among a coupled state, a slippage state and a decoupled state in accordance with a lock-up hydraulic pressure indicating a pressure of the hydraulic oil to be supplied thereto, the torque converter unit being configured to transmit the driving force from the engine to the drive unit through either the torque converter or the lock-up clutch;
   a control unit configured to control the lock-up hydraulic pressure for switching the lock-up clutch, the control unit being configured to execute a lock-up slippage control for switching the lock-up clutch into the slippage state when the work vehicle starts moving, the control unit being configured to control the lock-up hydraulic pressure based on the work instrument load information during execution of the lock-up slippage control,
   an engine speed detecting part configured to detect an engine speed; and
   an accelerator operating member to be operated by an operator,
   wherein the control unit is configured to set the target engine speed in accordance with an operating amount of the accelerator operating member and control the engine for regulating the engine speed detected by the engine speed detecting part to approach the target engine speed during execution of a normal control without execution of the lock-up slippage control, and
   the control unit is configured to modify the target engine speed based on the work instrument load information and the operating amount of the accelerator operating member such that a modified value of the target engine speed increases as the load of the work instrument increases, and to calculate a command value of the lock-up hydraulic pressure for regulating the engine speed detected by the engine speed detecting part to approach the modified target engine speed during execution of the lock-up slippage control.

2. The work vehicle according to claim 1, wherein the control unit is configured to control the lock-up hydraulic pressure for reducing the amount of torque to be transmitted by the lock-up clutch when the work instrument load information representing increase in a load of the work instrument is detected during execution of the lock-up slippage control.

3. The work vehicle according to claim 1, wherein the work instrument includes a boom, and
   the work instrument load detecting part is a boom operation detecting device configured to detect a position of a boom operating member for operating the boom, the work instrument load detecting part being configured to detect the position of the boom operating member as the work instrument load information.

4. The work vehicle according to claim 1, wherein the control unit is configured to calculate a thermal load of the lock-up clutch and finish executing the lock-up slippage control when the thermal load becomes greater than or equal to a predetermined threshold.

5. A method of controlling a work vehicle, the work vehicle including: an engine; a drive unit configured to be driven by driving force from the engine for causing the work vehicle to travel; a hydraulic pump configured to be driven by the driving force from the engine for discharging hydraulic oil; a work instrument configured to be driven by the hydraulic oil from the hydraulic pump; a torque converter unit including a torque converter and a lock-up clutch; and an accelerator operating member to be operated by an operator, the lock-up clutch being configured to be switched among a coupled state, a slippage state and a decoupled state in accordance with a lock-up hydraulic pressure indicating a pressure of the hydraulic oil to be supplied thereto, the torque converter unit being configured to transmit the driving force from the engine to the drive unit through either the torque converter or the lock-up clutch, the method of controlling a work vehicle comprising:
   detecting an engine speed;
   detecting an operating amount of the accelerator operating member;
   detecting a work instrument load information pertaining to a load of the work instrument;
   executing a lock-up slippage control for switching the lock-up clutch into the slippage state when the work vehicle starts moving by controlling the lock-up hydraulic pressure based on the work instrument load information;
   setting the target engine speed in accordance with the operating amount of the accelerator operating member and controlling the engine for regulating the detected engine speed to approach the target engine speed during execution of a normal control without execution of the lock-up slippage control; and
   modifying the target engine speed based on the work instrument load information and the operating amount of the accelerator operating member such that a modified value of the target engine speed increases as the load of the work instrument increases, and calculating a command value of the lock-up hydraulic pressure for regulating the detected engine speed to approach the modified target engine speed during execution of the lock-up slippage control.

* * * * *